(12) United States Patent
Reid et al.

(10) Patent No.: US 6,321,037 B1
(45) Date of Patent: Nov. 20, 2001

(54) PORTABLE WATER HEATER

(75) Inventors: David Garth Reid; John Deane Weatherly, both of Auckland (NZ)

(73) Assignee: Waipuna International Limited, Auckland (NZ)

(*) Notice: Subject to any disclaimer, the term of this patent is extended or adjusted under 35 U.S.C. 154(b) by 0 days.

(21) Appl. No.: 09/462,571

(22) PCT Filed: Jul. 10, 1998

(86) PCT No.: PCT/NZ98/00099

§ 371 Date: Jan. 10, 2000

§ 102(e) Date: Jan. 10, 2000

(87) PCT Pub. No.: WO99/02033

PCT Pub. Date: Jan. 21, 1999

(30) Foreign Application Priority Data

Jul. 11, 1997 (NZ) .................................................. 328321

(51) Int. Cl.[7] .................................. B05B 1/24; F24H 1/10
(52) U.S. Cl. .......................... 392/473; 392/475; 392/466
(58) Field of Search ................................. 392/445, 447, 392/449, 450, 451, 454, 465, 475, 476, 477, 498

(56) References Cited

U.S. PATENT DOCUMENTS

| 5,078,123 | * | 1/1992 | Nagashima et al. .................. 126/374 |
| 5,265,318 | * | 11/1993 | Shero ....................................... 29/447 |
| 5,385,106 | * | 1/1995 | Langshaw ............................. 111/127 |

FOREIGN PATENT DOCUMENTS

2122511 * 1/1984 (GB) .

* cited by examiner

Primary Examiner—Teresa Walberg
Assistant Examiner—Thor Campbell
(74) Attorney, Agent, or Firm—Young Law Firm, P.C.

(57) ABSTRACT

A hand held dispenser of hot water intended for weed control purposes has a handle containing a hose connection, a flow regulator, a heating tube, an exit tube, a nozzle and a power switch. The handle is connected to a tube which contains a main electric water heating element surrounded by a tube through which water can flow form the bottom of the wand towards the handle before being piped through an exit tube to the nozzle. A temperature sensor is positioned adjacent the handle to regulate the power supplied to the heating element.

16 Claims, 4 Drawing Sheets

US 6,321,037 B1

PORTABLE WATER HEATER

FIELD OF THE INVENTION

Figure 1:
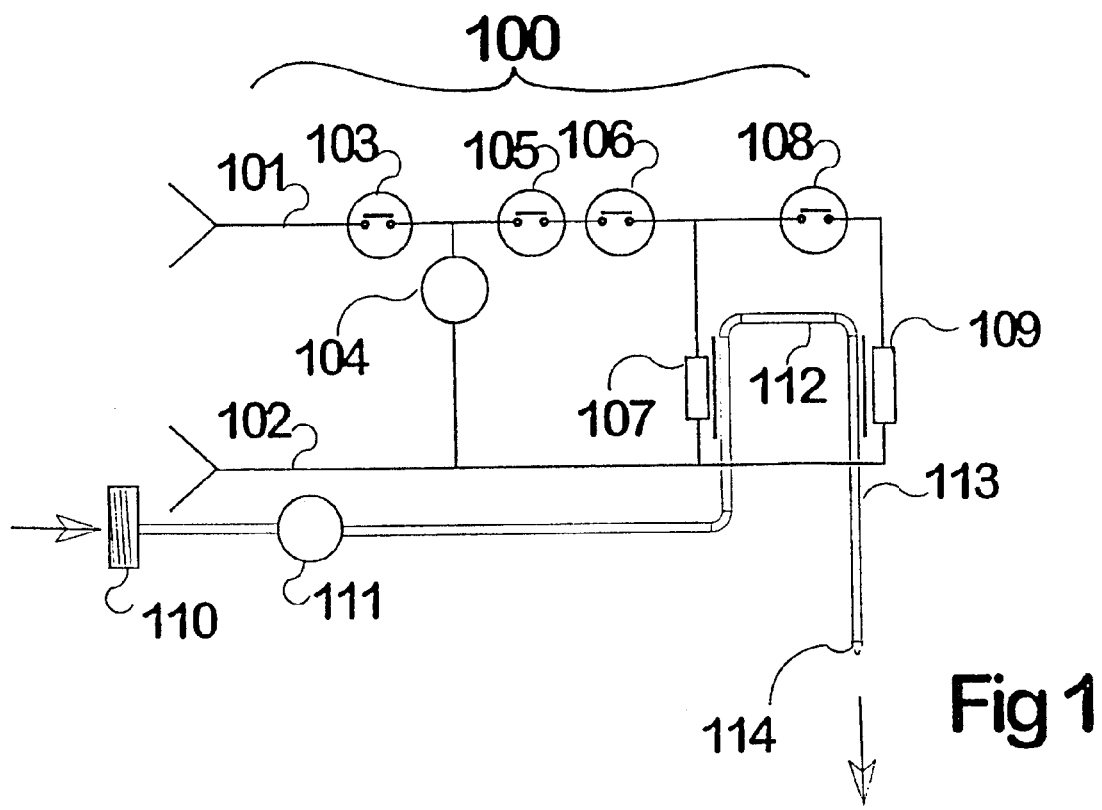

This invention relates to herbicidal apparatus and methods for use, more particularly to of hot water and/or steam for use in destroying vegetation, and to a hand-held device for dispensing heated water.

BACKGROUND

A weed is generally defined as a plant growing where it is not required. Destruction of weeds can be by a number of means; physical removal, covering, herbicidal chemicals, burning, or scalding with hot water, steam, or both. These methods have their own particular disadvantages for particular applications; for example herbicidal chemicals may leave residues harmful to other life forms or drift from the target plant on to a valuable plants. Burning can start destructive fires.

The preferred method; using hot water, does not leave residues and although it does require energy at the point of use there is no particular energy requirement involved in supplying the raw material: water.

There is a good deal of merit in minimizing the amount of heat energy used by a hot-water applicator means, because water has a high specific heat and the act of boiling water consumes even more heat. Energy consumption is always seen as a disadvantage of hot-water weed control though it must be remembered that it is highly visible whereas the energy cost of preparing or disposing of a weed killer is invisible.

OBJECT

It is an object of the present invention to provide an improved means for the provision of heated water by a portable herbicidal appliance, or one which will at least provide the public with a useful choice.

STATEMENT OF THE INVENTION

In one aspect the invention provides a portable water heater capable of generating a flow of water at around its boiling point, suitable for use in killing plants, having a water inlet for connection to a source of water, water heating means, and an outlet nozzle, wherein there is means for restricting the flow of water through the water heating means; the water heating means comprises an electrical heating means and means for sensing at least the outlet water temperature and means to control the amount of power applied to the water heating means to regulate the temperature of the heated water leaving the outlet.

Preferably the portable water heater is fabricated in the configuration of a wand, capable of being held, using a handle on a first end, by a standing person, the outlet nozzle being situated at a second end of the wand, and the water inlet being situated on or close to the handle.

Preferably the water heating means includes a first heating element for raising the water temperature from that at an inlet, and a second heating element capable of receiving the flow of water from the first heating element, Preferably the second heating element at least is controllable by means of a temperature-sensitive control device in thermal contact with an outlet for heated water so that the second heating element is capable of further heating as required and holding the outlet water temperature at a desired temperature.

Preferably the first heating element raises the inlet water temperature to about 75–85 degrees C. at typical rates of flow.

Preferably the second heating element further raises the temperature of the flow of water to between 95 and 100 degrees C. within a range of typical rates of flow and/or within a range of inlet water temperatures.

Preferably the means to control the amount of power applied to the water heating means comprises an electronic controller capable regulating the power level supplied to the electrical heating means in response to the sensed water outlet temperature.

Preferably the controller applies maximum power if the outlet water temperature is below a predetermined first limit and less than full power if the outlet water temperature is above this predetermined first limit.

Preferably the flow of water through the wand is arranged so that when in use, water flows from the handle towards the outlet end and then flows upwards through the electrical heating means and exits the electrical heating means near the handle, and the resulting hot water is then piped to the outlet nozzle.

Preferably the electrical heating means comprises a single resistance heating element of about 2 kW rating surrounded by a co-axial tube through which the water can flow.

More preferably the format of the electrical energy consumed is compatible with household mains supplies, for instance 2 kW at 230V AC.

Preferably the flow rate of water is constrained so that available power levels are capable of raising the outlet temperature to lie within the preferred range of temperatures.

Preferably the invention is provided with safety devices capable of interrupting the flow of electricity in the event of overheating.

Preferably the invention is provided with safety devices capable of interrupting the flow of electricity in the event of a hazardous amount of current leakage into the water system.

DRAWINGS

The following is a description of a preferred form of the invention, given by way of example only, with reference to the accompanying diagrams.

FIG. 1: shows the electric circuit of a wand, with the water flow shown diagrammatically.

Figure 2:
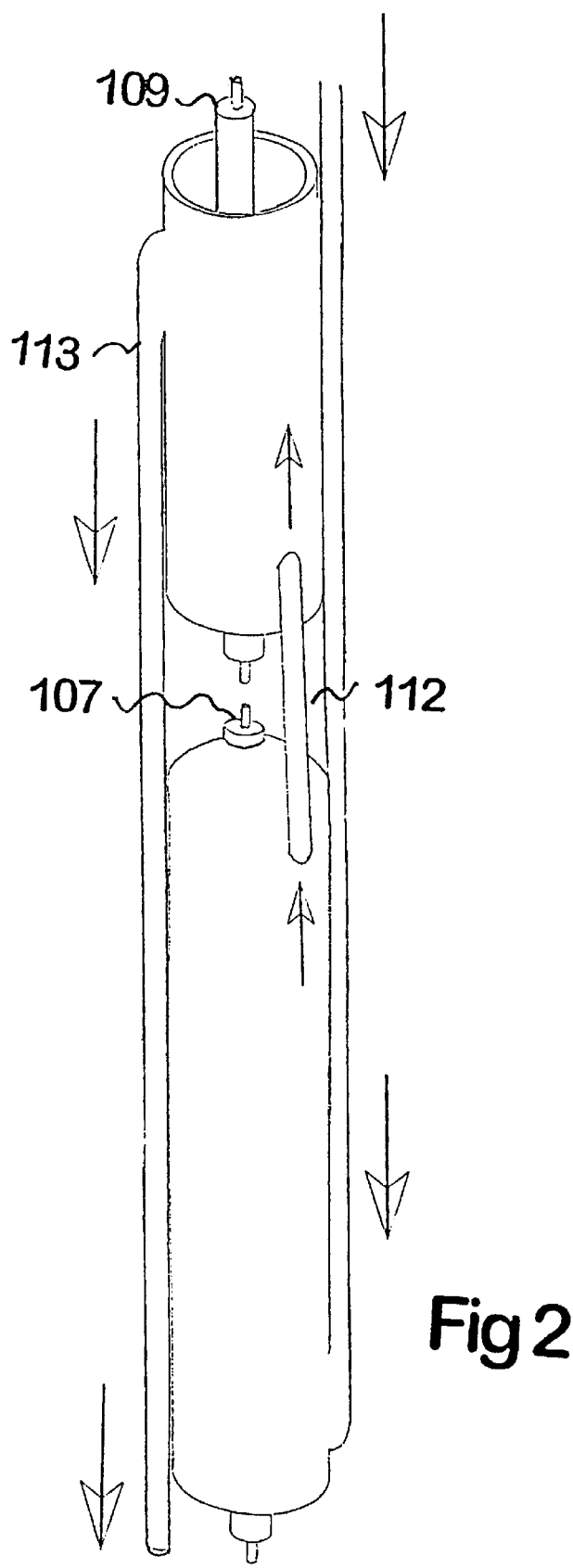

FIG. 2: shows the relationship of the two heater elements to the flow of water.

Figure 3:
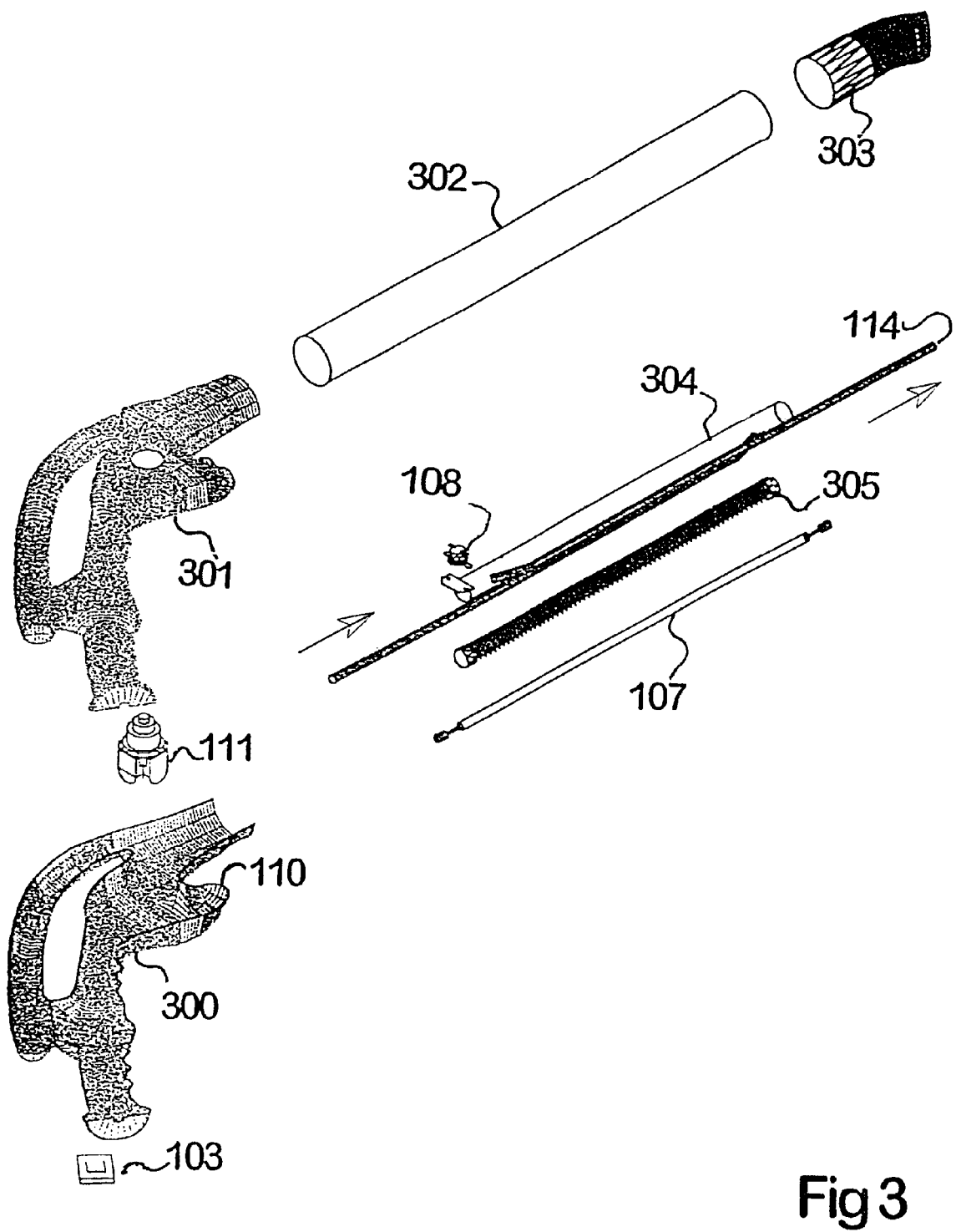

FIG. 3: shows the parts of a wand in "exploded view".

Figure 4:
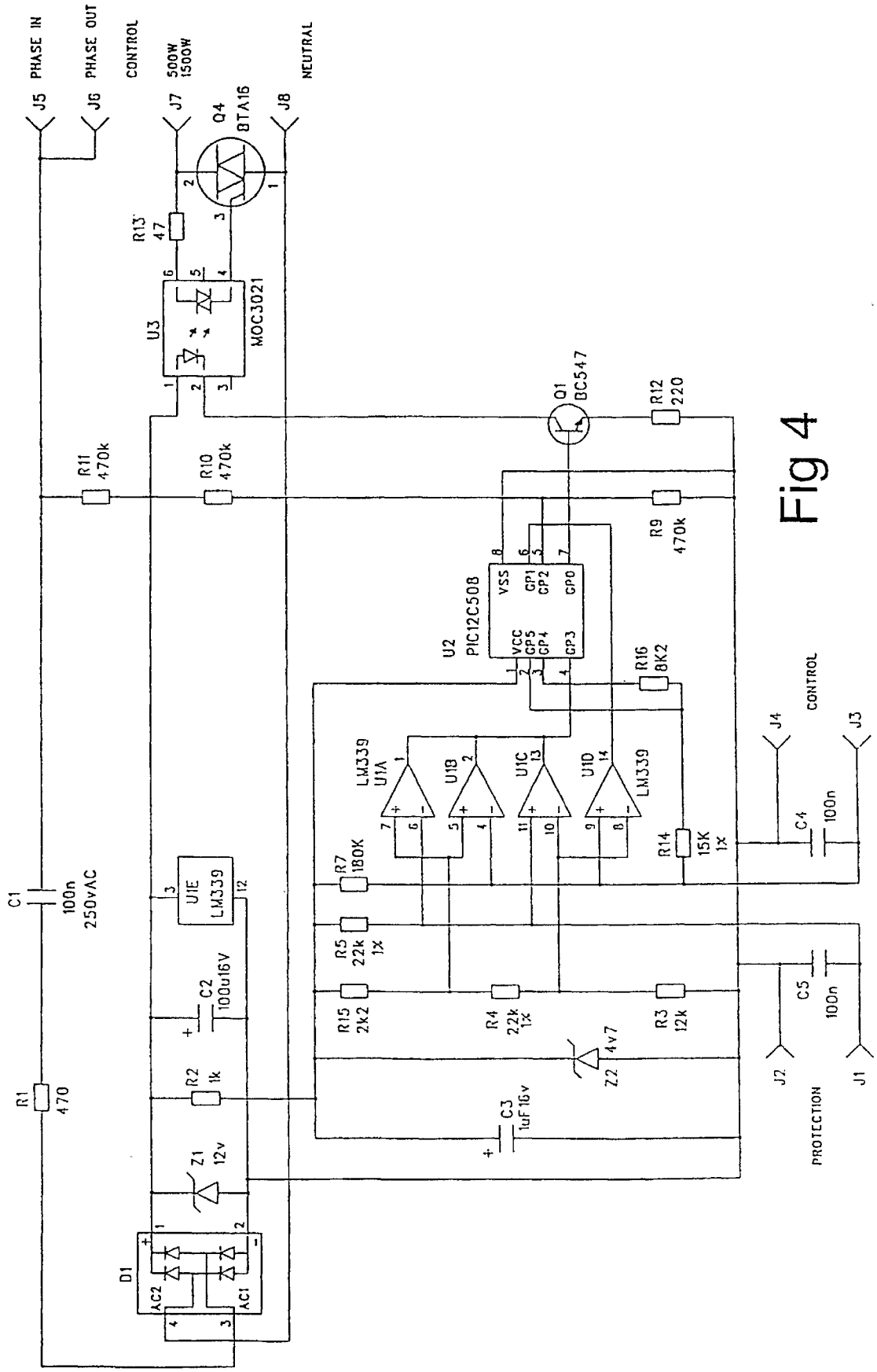

FIG. 4: shows a circuit diagram for an electronic temperature controller for use in the second embodiment.

FIRST EMBODIMENT

This embodiment will be described with reference to an improved hand-held appliance, in the form of a stick or wand having a handle at one end, which accepts tap water and single-phase mains electricity and provides a flow of water/steam at the other end.

This embodiment uses a thermostat and a pair of heaters (although the second embodiment makes use of an electronic controller rather than a thermostat, and may use one or more heating elements).

The first embodiment as shown by FIGS. 1 to 3, has a main heater to raise the temperature of the incoming water from its supply temperature (which might be anywhere between zero and 30 degrees in various localities) by about 60 degrees given a preferred flow rate of water, and a second, controlled heater following the main heater that heats the water just enough to reach the target temperature (preferably 95 degrees C.) which is set by a preset thermostat located near the output of the second heater. Typically it closes its contacts at 95 degrees C. and opens its contacts at 100 degrees C. One preferred brand of thermostat is "Clickson" (trade mark) but its equivalents can be used.

Preferably the main heater is about three times as powerful as the controlled heater and given the limitations of a typical domestic power source, we prefer to use an about 1.5 kW resistance element inside the main heater and a 0.5 kW resistance element inside the controlled heater so that the total load on the mains supply is under ten amperes. The thermostat controls a relatively small resistive load and so should exhibit a long lifetime. Preferred commercially available devices are rated for millions of operations.

Given a limited maximum input of energy, the water flow entering the heating system is preferably controlled so that the output is neither boiled away inside the main heater (as for low flow rates) nor too cold on exit (if the flow rate is too high). A pressure-reducing valve within the wand provides sufficient flow control. For the sake of over-temperature protection (suppose the water flow became insufficient during use) an over-temperature switch is provided in series with both heaters and in case that device fails, a thermal fuse set at about 180 degrees C. is also included in series with both heaters.

Previous versions of this wand relied on user-modified flow control (using an adjustable pressure valve) to indirectly control the exit water temperature. This was insufficient; for example the exit temperature was affected by the inlet temperature at a given flow rate and there was a significant time delay between making the adjustment and getting a certain result (a certain exit temperature, which had to be judged by eye) which time delay made the instrument relatively hard to use.

Consequently the development of a wand for hot-water weed control (or other applications) capable of producing an output at a set temperature when used with a range of inlet temperatures and a reasonable range of flow rates is an improvement over the original versions. Furthermore it can compensate for a range of incoming voltages. The voltage available at the wand depends on the overall load on that phase, and also on the amount of extension cable presently in use.

FIG. 1 shows an example electric circuit 100 for a wand, with the water flow (arrows) also shown diagrammatically. 101 is the phase wire from a connector or lug, and 102 is the neutral or return wire, though of course these may be interchanged and may both carry a similar voltage if an isolating transformer is used or if the device is driven from between two phases. Earthing is not shown. Some countries prefer double-insulation as a safety standard to be met. Where earth wiring is required, an earth wire would be connected to the outer guard over the heater section. (On the topic of earthing, it is possible to include a current imbalance sensor in the wand or within the power cable leading to the wand as a further safety device). The phase line 101 passes through an on-off switch 103, and the indicator lamp 104 shows when power is connected. Item 105 is a thermal fuse which becomes (and remains) open-circuit if exposed to a temperature of for example 180 degrees C. Item 106 is a (reversible) thermal switch, present as a safety feature in case power is applied without water flow, which typically cuts out at about 120 degrees C. Item 107 is a 1.5 kW heater element which is normally on whenever the control switch 103 is closed and power is connected. Item 108 is a thermostat device, preferably one which closes at 100 degrees C. and opens at 95 degrees C.—so that the second heater 109 (typically 0.5 kW rating) is under thermostat an control. The thermostat 108 is actually in contact with the water conduit at about 113, on exit from contact with the heater 109. We prefer that the second controllable heater smaller capacity one for longer thermostat life and if possible for a quicker response time.

Water flows from an inlet 110 through a pressure-reducing valve 111 through a pipe enclosing the heaters 107 and 109, and exits at a nozzle 114. The nozzle resistance and the controlled pressure inside the pipe 112 sets an approximate flow rate. The actual direction of flow is not so simple—see FIG. 2.

FIG. 2 shows the two heat exchange units and the heater elements 107 and 109 with water pipes, in the relative positions that they occupy within the wand. Note the direction of water flow, as shown by the arrows. The nozzle 114 is below the arrow at lower left. Marker 113 illustrates the water outflow from the smaller, controlled element and is the approximate position of the thermostat that controls power flow through the smaller controlled heat exchanger around the element 109. Water flows in from the pipe at top right and enter the most dependent part of the larger heat exchanger. It then flows upwards through the connecting tube 112 into the smaller heat exchanger, the one having a controlled heater. Note that the open top of the upper exchanger is part of the diagram only; the top is enclosed in practice. The drawing shows the heater 109 within the heat exchanger. The drawing does not show the pipe 305 (see FIG. 3) that is in thermal contact with the heater element and with the water to be heated.

FIG. 3 shows an exploded view of a wand according to this invention. In this drawing only one heater/heat exchanger/surrounding pipe is shown. 300 and 301 are the two halves of a moulded plastic handle, containing the power switch 103 and a hose inlet 110, as well as a water pressure control valve 111. In earlier embodiments this pressure valve was externally adjustable, as a temperature control means or as a compensator for inlet temperature or voltage. The tube 302 surrounds the entire heating section of the wand and may be 600 mm to 1 meter long; depending to some extent on the target market. Generally the length is about 1 meter from the nozzle 114 (inside the nozzle shroud 303) to the handle. Item 304 is a pipe, usually made of copper or stainless steel, surrounding the factory-made heating element 107 comprising a nichrome wire surrounded by mineral insulation inside a metal tube. In a prototype we used a spirally swaged heat exchanging surface or tube 305 which was tightly fitted over the element, but this is not necessary. Water flows in the space between 304 and 305. The pipe 114 represents the outlet from the heat exchanger unit, (note that it emerges from the far end of the exchanger near the thermostat 108). The nozzle would be placed at the position of the marker 114.

Note that in these wands the water is led from the handle to the lowest part of the heater elements and the heated water is taken from the highest part, down the length of the wand, to the nozzle. This helps to ensure that if boiling occurs it tends to displace least water.

This wand includes:

(1) water flowing along the outside of one or more hearing elements of the resistance heater type (typically Nichrome wire, inside a mineral insulator, surrounded by a hard metal tube).

(2) Water flow commences at the handle, is taken to the most dependent end of the chain of heaters, issues from the heaters near the handle, and is carried by pipe down again to the dependent nozzle. The wand is naturally used with the handle higher than the ground, and the water flow direction allows a boiling process to displace steam rather than boiling water if the incoming water flow is reduced and the water temperature transiently exceeds 100 degrees C.

(3) The handle has been designed ergonomically for use by left or right-handed people.

Numerical statistics:

Fuel input comprises electricity: 230V, up to 10 A.

Water input comprises 21 liters per hour at preferably about 45 pounds per square inch pressure, at an input temperature of nominally 15 degrees C. The exit water temperature is at 95 degrees C.

The exit nozzle diameter is 0.63 mm.

Because the device is thermally insulated all the energy dissipated from the heaters is passed to the water, thus it exhibits substantially 100% energy recovery (in steady-state conditions). Of course it is desirable to use extension cables for power which have ample power ratings (low resistance; relative to the heater resistance) so that the cable as voltage drop is small. This condition applies in particular to countries using American utility standards; 117V AC single phase outlets.

SECOND EMBODIMENT

This uses an electronic controller as shown in FIG. 4, instead of the thermostat of FIG. 1. It can be used with two or more heating elements but we have found that it is best used with a single 2 kW heating element running the length of the wand. The circuit of FIG. 4 and its main temperature sensor can replace item 108 in FIG. 3, with all other items being the same (except for tube 305 which is not required).

The wand 302 is a hand held tool, resembling a fat walking stick, connected to a 220–240 v 50–60 Hz power supply via a 10 Amp extension cable, and connected to a garden hose via a snap-on connector.

The hose water passes through a copper pipe 304 with 2 kW of heater(s) 107 along its central axis. Preferably this is single 2 kW resistance heater but two or more elements may be used if required. The outlet water is restricted to a fine jet by a nozzle 114, and the inlet water comes through a pressure regulator to provide a consistent water flow rate.

An electronic controller uses a sensor placed near the heater outlet to adjust the power to the elements so that a temperature just under 100° C. is maintained for the outlet water. A second sensor is placed near the middle of the element as a protective device, and it will turn the controller off if it detects unusually high temperatures. The power will have to be switched off and the water should be allowed to cool before restarting.

Startup.

Firstly, check that the water hose and power extension lead are long enough to reach the area of intended use. Always connect the water hose first., running it for long enough to remove any air pockets before making the snap connection. In operation, the use of water is quite small, and it will take a long time to clear air pockets. Make this connection with the water turned off, to avoid getting water splash onto the wand handle, but then keep the water on to avoid air traps being formed. Use a hose type that will not kink easily, as kinks will stop the water flow. Water flow from the wand should be smooth and free of any 'spitting' caused by air pockets before connecting the power source to the wand. During startup and operation, the wand should be held with the handle distinctly higher than the outlet jet. This requirement is to remove air from the heater tubes. Cold water is piped to the bottom (near the outlet jet), and hot water exits the heater near to the handle, before being piped down to the jet. This means incoming water clears air from the heating element(s). Power may be connected and turned on when water flow is stable.

Electrical operation involves a startup period, followed by a run mode.

When switched on, a 1 second pause allows the controller to stabilise. It then checks the water temperature. If above 30° C., approx 80% power is applied, and if below 30° C., full power is applied. The controller then monitors the time to reach 85° C., then turns off for 2.5 seconds, then starts operation at a power level appropriate for the inlet water temperature. This power level is then adjusted up or down, as required, to maintain a temperature between 95° C. and 100° C. This change is slow acting, in steps of about 3%, at about half minute intervals.

The startup process takes typically 1 minute to happen, but in some circumstances, may take up to about 1 minute 40 seconds. Hot inlet water takes less time than cold inlet water.

The startup process is indicated by a neon light in the handle. The timed rise to 85° C. has a 'flash' repetition time of 1 second, followed by a 2.5 second off, then a running 'flash' time of approximately 0.6 seconds.

Should the neon turn off, and not come back on, the protection sensor has probably detected too high a temperature in the heater, probably because of a water flow restriction. This would be a lockout condition requiring power off, then restore the water flow, then wait for the outlet water to cool right down before turning the power back on.

Once water flow has been restored, it is safe to turn the power back on, but the startup process will assume that very hot water is being input, and will enter the run state with very low applied power and then take many minutes to get back to operating temperature. It takes less time to allow cool down and go through normal startup.

When operating, move the hot water jet outlet close up to the weed, as the water temperature drops quite quickly as distance is increased.

To end the session, switch the power off and allow more than a minute to cool down before turning off the water and disconnecting the hose. Empty most of the water from the wand by holding approximately horizontal and tilting one end up and down slowly several times.

Controller details.

Refer to Circuit Diagram of FIG. 4.

230V phase is connected to J5.

Neutral to J8.

Heating elements between J6 and J7.

Control sensor (NTC Thermistor) between J3 and J4. Sensor has Teflon insulated wire in an aluminium sleeve with iridium passivation.

Protection sensor connects between J1 and J2. Both sensors are interchangeable except for lead length.

Controller power supply.

A capacitive current supply from the mains is used, with C1 providing AC current to the bridge rectifier D1. Resistor R1 provides spike current limiting, and is of a type that withstands current spikes. C1 capacitor is an X2 rated 250V AC type with self-healing metallisation.

Zener Z1 limits voltage out of the bridge rectifier.

C2 smooths ripple and provides storage for the triac firing pulses.

R2 feeds current into Z2 which stabilizes the sensor bridge and micro-Controller voltages.

The controller and the sensors swing above and below the neutral line by up to 13V, as the bridge conducts in each direction. The opto coupler, U3, isolates this movement. Resistors R10, 11 are used in series to withstand the 340V peaks associated with 240V systems, in the process of detecting zero-crossings.

Controller general.

U2, the microprocessor watches for mains zero crossings, and drives the triac firing circuit, Q1, R12, U3.

Power control is applied by switching integral cycles on or off with a duty cycle of one second during heat up, and 0.64 seconds during running. The run period may change in future versions.

U2 also monitors the outputs of the 4 comparators in U1, which compare the sensors against voltage dividers in the sensor bridge.

U1D is the control comparator.
U1C is the protection comparator.
U1B is the control sensor open circuit detector.
U1A is the protection sensor open circuit detector.

The microprocessor uses an internal R-C oscillator, with timings controlled from zero-crossings.

In the run mode, power is apportioned over a 0.64 second period. The "on"_ratio is constant for the next approximate ½ minute, then the temperature is checked and the "on"_ratio changed by one integral cycle, either more or less, as required. This process continues until interrupted by the protection sensor, or turned off.

Board coating has been used to reduce sensitivity to condensation in the garden shed environment.

Triac

The triac has been placed in the 'neutral switching' position, as we may wish to use direct firing in the future. Using the opto coupler would allow 'phase switching' if this were desirable.

An isolated tab Triac is used, or an encapsulated tab type. Significant heat sinking is required, and the triac is mounted on a copper flag connected to the cold water inlet pipe, which is earthed.

A dry to 220 insulator is used under the triac to increase the isolation voltage.

Variations

If more than one heating element is used the wand can be shorter in length and the elements disposed side by side, but for the water flow and heating required we find that a single 2 kW heater is sufficient or two 1 kW heater elements can be positioned end to end so that water flows in series from one to the other.

The control device could be settable as with a control knob, rather than fixed at 95 degrees C. This device would permit water preheating by means of a black feed hose lying in the sun, without loss of control.

A nozzle valve could be fitted; for example connected to a trigger on the handle so that boiling water is released only on demand, if closer control of the heating elements is installed. When flow stops, heat rises and the flow of electricity is accordingly interrupted.

There is a pressure valve (111) in the described embodiments. This may be deletable.

The description so far has been for a domestically compatible wand, capable of running with a garden hose and a single-phase power cord. This temperature-controlled wand could be scaled up to larger sizes. For example horticulturists might use a truck or tractor-based installation having an appropriate electric generator such as a three-phase generator or one designed for welding purposes (of course with suitable wand modifications) and a higher feed rate. The water might be preheated around an engine exhaust. This would be useful for viticulture, for local body weed control, or the like.

Advantages

These two embodiments provide:

Output of heated water within a controlled temperature range despite reasonable variations in inlet temperature;

Output within a controlled temperature range despite reasonable variations in inlet flow rate.

Output within a controlled temperature range despite reasonable variations in mains voltage at the wand.

This method of controlling the output temperature is more direct than other methods such as regulating the flow of water precisely, at least in part because a number of variables (flow rate, inlet temperature, amount of energy available) all converge to affect outlet temperature and so one control loop can counteract any or all such variations.

This allows the ordinary user to simply use the wand even though the incoming water flow may vary (though the seasons or if the sun shines on a heat-absorbing hose, or incoming water temperature may vary (perhaps some other use of water lowers pressure temporarily), or the voltage of the supplied electricity may vary, such as during other demands on power or if an extension cord is added to the electric circuit.

Without controls of the type described in this invention, the outlet temperature may at times be sub-effective, or the wand may boil the water, wasting power and harassing the user. A wand which periodically exhibits internal boiling may at the least seem to be unsafe.

Unnecessary expenditure of energy is limited.

Incoming water may be preheated by some kind of solar heater, perhaps simply within a black hose, without affecting the stability of the wand.

Industrial Application

The invention can be applied in the control of plant growth (generally weed growth) especially in proximity to valuable plants or where chemical residues or air-borne spray may have adverse effects. This invention minimises the amount of energy used.

Finally, it will be appreciated that various alterations and modifications may be made to the foregoing without departing from the scope of this invention as set forth.

What is claimed is:

1. A portable water heater capable of generating a flow of water at around its boiling point, suitable for use in killing plants, having a water inlet for connection to a source of water, water heating means, and an outlet nozzle, wherein there is means for restricting the flow of water through the water heating means; the water heating means comprises an electrical heating means and means for sensing at least the outlet water temperature of the water leaving the electrical heating means and means to control the amount of power applied to the water heating means to regulate the temperature of the heated water leaving the outlet, and wherein the flow of water through the wand is arranged so that when in use, water flows from the handle towards the outlet end and then flows upwards through the electrical heating means and exits the electrical heating means near the handle, and the resulting hot water is then piped to the outlet nozzle.

2. A portable water heater as claimed in claim 1, wherein the portable water heater is fabricated in the configuration of a wand, capable of being held, using a handle on a first end, by a standing person, the outlet nozzle being situated at a second end of the wand, and the water inlet being situated on or close to the handle.

3. A portable water heater as claimed in claim 2, wherein the water heating means includes a first heating element for raising the water temperature from that at an inlet, and a second heating element capable of receiving the flow of water from the first heating element, wherein the second heating element at least is controllable by means of a temperature-sensitive control device in thermal contact with an outlet for heated water so that the second heating element is capable of further heating as required and holding the outlet water temperature at a desired temperature.

4. A portable water heater as claimed in claim 3, wherein the first heating element raises the inlet water temperature to about 75–85 degrees C. at typical rates of flow.

5. A portable water heater as claimed in claim 4, wherein the second heating element further raises the temperature of the flow of water to between 95 and 100 degrees C. within a range of typical rates of flow and/or within a range of inlet water temperatures.

6. A portable water heater as claimed in claim 2, wherein the means to control the amount of power applied to the water heating means comprises an electronic controller capable regulating the power level supplied to the electrical heating means in response to the sensed water outlet temperature.

7. A portable water heater as claimed in claim 6, wherein the controller applies maximum power if the outlet water temperature is below a predetermined first limit and less than full power if the outlet water temperature is above this predetermined first limit.

8. A portable water heater as claimed in claim 7, wherein the electrical heating means comprises a single resistance heating element of about 2 kW rating surrounded by a co-axial tube through which the water can flow.

9. A portable water heater as claimed in claim 1, wherein the water inlet is adapted to be connected to a garden hose for the continuous supply of water from a mains water supply.

10. A portable water heater as claimed in claim 1, wherein electrical heating means is adapted to be supplied by a single phase mains supply of electricity via a power cable.

11. A portable water heater capable of generating a flow of water at around its boiling point, suitable for use in killing plants, having a water inlet for connection to a source of water, water heating means, and an outlet nozzle, means for restricting the flow of water through the water heating means; the water heating means comprises an electrical heating means and means for sensing at least the outlet water temperature of the water leaving the electrical heating means and means to control the amount of power applied to the water heating means to regulate the temperature of the heated water leaving the outlet, wherein the electrical heating means comprises a single resistance heating element of about 2 kW rating surrounded by a co-axial tube through which the water can flow, and wherein the flow of water through the wand is arranged so that when in use, water flows from the handle towards the outlet end and then flows upwards through the electrical heating means and exits the electrical heating means near the handle, and the resulting hot water is then piped to the outlet nozzle.

12. A portable water heater as claimed in claim 11, wherein the portable water heater is fabricated in the configuration of a wand, capable of being held, using a handle on a first end, by a standing person, the outlet nozzle being situated at a second end of the wand, and the water inlet being situated on or close to the handle.

13. A portable water heater as claimed in claim 11, wherein the water inlet is adapted to be connected to a garden hose for the continuous supply of water from a mains water supply.

14. A portable water heater as claimed in claim 11, wherein electrical heating means is adapted to be supplied by a single phase mains supply of electricity via a power cable.

15. A portable water heater as claimed in claim 11, wherein the means to control the amount of power applied to the water heating means comprises an electronic controller capable regulating the power level supplied to the electrical heating means in response to the sensed water outlet temperature.

16. A portable water heater as claimed in claim 11, wherein the controller applies maximum power if the outlet water temperature is below a predetermined first limit and less than full power if the outlet water temperature is above this predetermined first limit.

\* \* \* \* \*